United States Patent [19]

Hwang et al.

[11] Patent Number: 5,985,212
[45] Date of Patent: *Nov. 16, 1999

[54] HIGH STRENGTH LEAD-FREE SOLDER MATERIALS

[75] Inventors: Jennie S. Hwang, Moreland Hills; Holger J. Koenigsmann, Oakwood, both of Ohio

[73] Assignee: H-Technologies Group, Incorporated, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/764,293

[22] Filed: Dec. 12, 1996

[51] Int. Cl.$^6$ .................................................. C22C 13/00
[52] U.S. Cl. .......................................... 420/560; 148/400
[58] Field of Search .................................... 420/557, 560, 420/561, 562; 148/400

[56] References Cited

U.S. PATENT DOCUMENTS

| | | | |
|---|---|---|---|
| 4,670,217 | 6/1987 | Henson et al. | 420/562 |
| 4,695,428 | 9/1987 | Ballentine et al. | 420/561 |
| 4,758,407 | 7/1988 | Ballentine et al. | 420/560 |
| 4,778,733 | 10/1988 | Lubrano et al. | 428/647 |
| 4,806,309 | 2/1989 | Tulman | 420/562 |
| 4,879,096 | 11/1989 | Naton | 420/561 |
| 4,929,423 | 5/1990 | Tucker et al. | 420/561 |
| 5,102,748 | 4/1992 | Wylam et al. | 428/647 |
| 5,229,070 | 7/1993 | Melton et al. | 420/557 |
| 5,242,658 | 9/1993 | Stevens et al. | 420/557 |
| 5,256,370 | 10/1993 | Slattery et al. | 420/557 |
| 5,328,660 | 7/1994 | Gonya et al. | 420/562 |
| 5,344,607 | 9/1994 | Gonya et al. | 420/562 |
| 5,368,814 | 11/1994 | Gonya et al. | 420/587 |
| 5,410,184 | 4/1995 | Melton et al. | 257/772 |
| 5,414,303 | 5/1995 | Gonya et al. | 257/772 |
| 5,429,882 | 7/1995 | Carey, II et al. | 428/647 |
| 5,435,857 | 7/1995 | Han et al. | 148/24 |
| 5,435,968 | 7/1995 | Panthofer | 420/561 |
| 5,439,639 | 8/1995 | Vianco et al. | 420/562 |
| 5,455,004 | 10/1995 | Slattery et al. | 420/562 |
| 5,520,752 | 5/1996 | Lucey, Jr. et al. | 148/400 |
| 5,538,686 | 7/1996 | Chen et al. | 420/557 |

FOREIGN PATENT DOCUMENTS

| | | |
|---|---|---|
| 2131256 | 3/1995 | Canada . |
| 2527627 | 1/1976 | Germany . |
| 55-076035 | 6/1980 | Japan . |
| 06269982 | 9/1994 | Japan . |
| 06344180 | 12/1994 | Japan . |
| 08206874 | 8/1996 | Japan . |
| 08243782 | 9/1996 | Japan . |
| 2 158 459 A | 11/1985 | United Kingdom . |
| 0 499 452 A1 | 2/1992 | United Kingdom . |
| 0 612 578 A1 | 2/1994 | United Kingdom . |
| 0 622 155 A1 | 4/1994 | United Kingdom . |
| 0704272 A1 | 9/1995 | United Kingdom . |

OTHER PUBLICATIONS

Anikeev et al., "Improvement in the solderability of steel with siliconized graphite by indium alloying of tin–copper–silver solder," Svar. Proizvod. (1981), 3, 21–3.

Anikin et al., "Study of the sealing of graphite–metal edge seals," Adgez. Rasplavov Paika Mater. (1979), 4, 88–92.

*Primary Examiner*—Sikyin Ip
*Attorney, Agent, or Firm*—Fay, Sharpe, Fagan, Minnich & McKee, LLP

[57] ABSTRACT

Lead-free solder compositions consisting of at least 75.0 weight percent Sn, between 0.01 and 9.5 weight percent Cu, between about 0.1 and 10.0 weight percent In, and optionally including one or more of the following elements: Zn in an amount of not greater than 9.0 weight percent, Se or Te in an amount of not greater than 5.0 weight percent, Ga in an amount of not greater than 5.0 weight percent, Sb in an amount of not greater than 1.0 weight percent, Al in an amount of not greater than 1.0 weight percent. Lead-free solder compositions consisting of at least 75.0 weight percent Sn, between 0.5 and 6.5 weight percent Ag, between 0.5 and 8.0 weight percent Bi, and optionally including one or more of the following elements: between 0.1 and 10.0 weight percent In, Se or Te in an amount of not greater than 5.0 weight percent, Ga in an amount of not greater than 5.0 weight percent. Lead-free solder compositions consisting of at least 75.0 weight percent Sn, between 0.1 and 0.8 weight percent Ag, between 0.1 and 10.0 weight percent In, and optionally including one or more of the following elements: Zn in an amount of not greater than 9.0 weight percent, Se or Te in an amount of not greater than 1.0 weight percent, Ga in an amount of not greater than 1.0 weight percent, Sb in an amount of not greater than 1.0 weight percent, Al in an amount of not greater than 1.0 weight percent.

1 Claim, No Drawings

HIGH STRENGTH LEAD-FREE SOLDER MATERIALS

FIELD OF THE INVENTION

The present invention relates to tin-based, lead-free solder alloys that have broad-based applications because of a low liquidus temperature and high strength. They are useful as metal joining materials, particularly for interconnections in electronics and microelectronics circuitry applications. Importantly, the compounds of the present invention replace toxic, lead-containing solders and thereby improve worker safety and allow for environmentally-friendly manufacturing processes to be performed. Furthermore, the materials of the present invention provide improved strength to meet the increased demands on the level of performance of the interconnecting material required in future microchip circuitry.

DESCRIPTION OF THE ART

Lead-containing solder alloys have been successfully used in electronics packaging as interconnecting materials for decades, connecting components electrically, thermally, and mechanically. For electronic printed circuitry, near-eutectic Sn—Pb solders have been chosen due to their good manufacturability and wetting behavior on typical substrates. However, due to the increased density of circuitry and power dissipation, stronger solders are currently required. In addition, the legislative mandate to eliminate or tax the use of lead because of environmental/health concerns is another powerful driving force to develop lead-free alloys.

In order to replace lead in solders, the new alloys must possess phase transition temperatures (liquidus and solidus temperatures) that are comparable to lead-containing solders. In addition, lead-free solders must have suitable physical characteristics, including acceptable electrical and thermal conductivities and thermal expansion coefficients. Furthermore, the lead-free solders must be metallurgically compatible with the substrates of components and boards, and must have acceptable mechanical properties and environmental shelf stability.

Some lead-free solder alloy compositions are known (see textbook: Jennie S. Hwang, *Modem Solder Technology for Competitive Electronics Manufacturing*, Mc-Graw Hill, New York, 1996, pp. 483–508), however, these compositions are deficient due to inferior strengths, incompatible physical properties, or inadequate natural resources of major constitutional elements. One particular known lead-free solder composition is comprised of Sn—Zn—In alloys that may also contain Cu (U.S. Pat. No. 5,538,686), however, the combined solid solution and dispersion strengthening in this compound is inadequate.

SUMMARY OF THE INVENTION

Accordingly, it is a primary object of this invention to provide a new and improved solder composition.

It is an advantage of this invention to provide a new and improved solder composition that is free of lead, providing the associated safety and avoiding significant environmental problems.

An additional advantage of the present invention is that the solder composition has physical attributes equivalent or superior to traditional lead containing solders.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the solder composition of this invention is comprised of a lead-free alloy including tin, copper and gallium. In addition, the alloy may further include indium, zinc, selenium and/or tellurium. Preferably, tin will comprise at least about 75 weight percent of the alloy composition. Preferably, the copper will comprise between 0.1 and 9.5 weight percent and gallium between 0.01 and 5.0 weight percent of the alloy. More preferably, the tin will comprise at least 85 weight percent of the alloy. More preferably, copper will comprise between 0.3 and 4.5 weight percent and gallium between 0.05 and 1.0 weight percent of the alloy composition.

In an additional preferred form of the invention, the solder will be comprised of between 0 and 6 percent by weight indium; between 0 and 9 weight percent zinc; and either selenium or tellurium in an amount between 0 and 1.0 weight percent. In a particularly preferred embodiment, indium is present in the alloy composition between 0.1 and 10.0 weight percent. In an additional preferred embodiment by the invention, at least indium and zinc (between 1.0 and 19.0 weight percent) are present in the alloy composition.

In an alternative embodiment of the invention, the lead-free solder alloy composition is comprised of tin, copper or silver, and indium and may optionally contain either selenium or tellurium. In addition, the composition may optionally contain zinc, gallium or bismuth. Preferably, the composition will contain at least 75 weight percent Sn, between 0.1 and 9.5 weight percent Cu and/or 0.1 and 0.8 percent Ag, and between 0.1 and 10.0 weight percent In.

In a further alternative embodiment of the invention, the lead-free alloy composition is comprised of tin, silver, bismuth, either selenium or tellurium, and may optionally contain gallium. Preferably, the composition will include at least 75 weight percent Sn, between 0.5 and 6.5 weight percent Ag, between 0.5 and 8.0 weight percent Bi, and between 0.1 and 5.0 weight percent of Se and/or Te.

DETAILED DESCRIPTION OF THE INVENTION

Lead-free solder alloys containing Sn (at least 75.0 and preferably 85.0 wt. %), Cu (between 0.3 and 4.5 wt. %) and Ga (between 0.05 and 1.0 wt. %) have tensile properties (according to ASTM E8-96) exceeding 40 MPa, preferably 45 MPa and more preferably 50 MPa. For a variety of purposes such as further increasing the strength or decreasing the liquidus temperature, the alloys may also contain one or more of the following elements: In (not more than 6.0 wt. %), Zn (not more than 9.0 wt. %), either Se or Te (not more than 1.0 wt. %). More particularly, each of the inventive solder alloys described herein provides these tensile properties. Moreover, lead-free solder alloys, of this invention, have tensile properties exceeding those of traditional 60 Sn/40Pb (weight percent) alloys. For a variety of purposes, such as further increasing the strengths, the alloys may also contain Se, Te, or Zn.

Lead-free solder alloys containing Sn (at least 85.0 wt. %), Cu (between 0.3 and 4.5 wt. %), Ga (between 0.05 and 1.0 wt. %), In (between 1.0 and 6.0 wt. %), and Zn (between 8.0 and 9.0 wt. %) have tensile properties significantly exceeding those of traditional 60Sn-40Pb (wt. %) alloys. For purposes such as further increasing the strength, the alloys may also contain up to 1.0 wt. % of either Se or Te.

Lead-free solder alloys containing Sn (at least 90.0 wt. %), Cu (between 2.0 and 5.0 wt. %), and In (between 1.0 and 6.0 wt. %) have tensile properties exceeding those of traditional 60Sn-40Pb (wt. %) alloys. For purposes such as further increasing the strength, the alloys may also contain up to 1.0 wt. % of either Se or Te.

Lead-free solder alloys containing Sn (at least 85.0 wt. %), Ag (between 0.1 and 0.8 wt. %), and In (between 1.0 and 6.0 wt. %) have tensile properties significantly exceeding those of traditional 60Sn-40Pb (wt. %) alloys. For a variety of purposes such as further increasing the strength or decreasing the liquids temperature, the alloys may also contain one or more of the following elements: Zn (not more than 9.0 wt. %), Ga (not more than 1.0 wt. %), either Se or Te (not more than 1.0 wt. %).

Lead-free solder alloys containing Sn (at least 85.0 wt. %), Ag (between 1.5 and 4.5 wt. %), Bi (between 1.0 and 8.0 wt. %), and either Se or Te (between 0.05 and 1.0 wt. %) have tensile properties significantly exceeding those of traditional 60Sn-40Pb (wt. %) alloys. For a variety of purposes such as further increasing the strength or decreasing the liquidus temperature, the alloys may also contain up to 1.0 wt. % Ga.

Lead-free solder alloys containing Sn (at least 85.0 wt. %), Ag (between 1.5 and 4.5 wt. %), In (between 1.0 and 6.0 wt. %), Bi (between 1.0 and 8.0 wt. %), an either Se or Te (between 0.05 and 1.0 wt. %) have tensile properties significantly exceeding those of traditional 60Sn-40Pb (wt. %) alloys. For a variety of purposes such as further increasing the strength or decreasing the liquidus temperature, the alloys may also contain up to 1.0% Ga.

Lead-free solder alloys containing Sn (at least 85.0 wt. %), Ag (between 1.5 and 4.5 wt. %), In (between 1.0 and 6.0 wt. %), Bi (between 1.0 and 8.0 wt. %), and Ga (between 0.05 and 1.0 wt. %) have tensile properties significantly exceeding those of traditional 60Sn-40Pb (wt. %) alloys.

EXAMPLES

The following examples are provided to help demonstrate the invention but are not intended to limit the scope thereof.

Example 1

Casting of a 60Sn-40Pb (wt. %) alloy was conducted by placing an inert container containing the alloying elements in a box furnace and heating the furnace to the anticipated melting temperature. The container was sealed with a lid that provided access to a thermocouple and a tube supplying argon to protect the melt from oxidation. The melt was periodically stirred to improve homogeneity and finally poured into an aluminum mold to provide tensile specimens. Room temperature tensile tests were conducted at a test speed of 1 mm min$^{-1}$. A 0.2% offset yield strength of 30 MPa and an ultimate tensile strength of 37 MPa were measured. A 95.3Sn-4.0Cu-0.5Ga-0.2Se (wt. %) alloy was prepared and tested in substantially the same manner as described above. A 0.2% offset yield strength of 42 MPa (exceeding the yield strength of the 60Sn-40Pb (wt. %) alloy by 40%) and an ultimate tensile strength of 49 MPa (exceeding the tensile strength of the 60Sn-40Pb (wt. %) alloy by 32%) were determined.

Example 2

A 91.1Sn-3.9Cu-1.0Ga-4.0In (wt. %) alloy was prepared and tested in substantially the same manner as described in Example 1. A 0.2% offset yield strength and an ultimate tensile strength of both 48 MPa (exceeding the yield strength and the ultimate tensile strength of the 60Sn-40Pb (wt. %) alloy by 60% and 30%, respectively) were determined.

Example 3

An 86.2Sn-0.7Cu-0.5Ga-4.0In-8.6Zn (wt. %) alloy was prepared and tested in substantially the same manner as described in Example 1. A 0.2% offset yield strength of 63 MPa (exceeding the yield strength of the 60Sn-40Pb (wt. %) alloy by 110% and the yield strength of 86.0Sn-5.0In-9.0Zn alloy (55 MPa) by 15%) and an ultimate tensile strength of 73 MPa (exceeding the tensile strength of the 60Sn-40Pb (wt. %) alloy by 97% and the tensile strength of 86.0Sn-5.0In-9.0Zn alloy (62 MPa) by 18%)) were determined.

Example 4

92.8Sn-3.0Cu-4.0In-0.2Se (wt. %) and 91.8Sn-4.0Cu-4.0In-0.2Se (wt. %) alloys were prepared and tested in substantially the same manner as described in Example 1. A 0.2% offset yield strength of 40 and 46 MPa, respectively (exceeding the yield strength of the 60Sn-40Pb (wt. %) alloy by 33 and 53%), and an ultimate tensile strength of 47 and 48 MPa, respectively (exceeding the tensile strength of the 60Sn-40Pb (wt. %) alloy by 27 and 30%), were determined.

Example 5

An 86.9Sn-0.5Ag-4.0In-8.6Zn (wt. %) alloy was prepared and tested in substantially the same manner as described in Example 1. A 0.2% offset yield strength of 56 MPa (exceeding the yield strength of the 60Sn-40Pb (wt. %) alloy by 87%) and an ultimate tensile strength of 64 MPa (exceeding the tensile strength of the 6OSn4OPb (wt. %) alloy by 73%) were determined.

Example 6

An 89.9Sn-3.1Ag-6.5Bi-0.5Se (wt. %) alloy was prepared and tested in substantially the same manner as described in Example 1. A 0.2% offset yield strength of 60 MPa (exceeding the yield strength of the 60Sn-40Pb (wt. %) alloy by 100%) and an ultimate tensile strength of 82 MPa (exceeding the tensile strength of the 60Sn-40Pb (wt. %) alloy by 122%) were determined.

Example 7

87.8Sn-3.2Ag-4.0In-4.5Bi-0.5Se (wt. %) and 87.3Sn-3.2Ag4.0In-4.5Bi-1.0Se (wt. %) alloys were prepared and tested in substantially the same manner as described in Example 1. A 0.2% offset yield strength of 72 and 64 MPa, respectively (exceeding the yield strength of the 60Sn-40Pb (wt. %) alloy by 140 and 113%), and an ultimate tensile strength of 84 and 77 MPa, respectively (exceeding the tensile strength of the 60Sn-40Pb (wt. %) alloy by 127 and 108%), were determined.

Example 8

An 87.5Sn-3.2Ag-4.0In-4.5Bi-0.8Ga (wt. %) alloy was prepared and tested in substantially the same manner as described in Example 1. A 0.2% offset yield strength of 75 MPa (exceeding the yield strength of the 60Sn-40Pb (wt. %) alloy by 150%) and an ultimate tensile strength of 77 MPa (exceeding the tensile strength of the 60Sn-40Pb (wt. %) alloy by 108%) were determined.

Thus it is apparent that there has been provided, in accordance with the invention, a lead-free solder alloy composition that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such modifications, and variations as fall within the spirit and broad scope of the appended claims.

We claim:

1. A lead-free alloy solder composition consisting of at least about 75 weight percent Sn, between about 0.01 and 9.5 weight percent Cu, between about 0.01 and 5.0 weight percent Ga, between about greater than 0 and 6 percent In and having a tensile strength of at least 48 Mpa.

* * * * *